(12) United States Patent
Moyer et al.

(10) Patent No.: US 8,589,738 B2
(45) Date of Patent: Nov. 19, 2013

(54) PROGRAM TRACE MESSAGE GENERATION FOR PAGE CROSSING EVENTS FOR DEBUG

(75) Inventors: William C. Moyer, Dripping Springs, TX (US); Richard G. Collins, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 353 days.

(21) Appl. No.: 13/013,337

(22) Filed: Jan. 25, 2011

(65) Prior Publication Data

US 2011/0119533 A1 May 19, 2011

Related U.S. Application Data

(63) Continuation-in-part of application No. 12/435,723, filed on May 5, 2009.

(51) Int. Cl.
*G06F 11/00* (2006.01)

(52) U.S. Cl.
USPC ............................................. 714/45; 717/128

(58) Field of Classification Search
USPC ................................ 714/45, 53; 717/127, 128
See application file for complete search history.

(56) References Cited

U.S. PATENT DOCUMENTS

| | | | |
|---|---|---|---|
| 5,630,049 A | 5/1997 | Cardoza et al. | |
| 5,822,588 A | 10/1998 | Sterling et al. | |
| 5,842,225 A | 11/1998 | Kohn | |
| 5,913,923 A | 6/1999 | Dunlap et al. | |
| 6,009,270 A | 12/1999 | Mann | |
| 6,101,524 A | 8/2000 | Choi et al. | |
| 6,145,100 A | 11/2000 | Madduri | |
| 6,167,536 A | 12/2000 | Mann | |
| 6,189,140 B1 | 2/2001 | Madduri | |
| 6,212,629 B1 * | 4/2001 | McFarland et al. | 712/241 |
| 6,282,701 B1 | 8/2001 | Wygodny et al. | |
| 6,499,123 B1 * | 12/2002 | McFarland et al. | 714/724 |
| 6,510,507 B1 * | 1/2003 | Matt et al. | 711/206 |
| 6,662,359 B1 | 12/2003 | Berry et al. | |
| 6,769,076 B1 | 7/2004 | Moyer et al. | |
| 6,779,145 B1 | 8/2004 | Edwards et al. | |
| 6,826,747 B1 | 11/2004 | Augsburg et al. | |
| 6,859,891 B2 | 2/2005 | Edwards et al. | |
| 6,918,065 B1 | 7/2005 | Edwards et al. | |
| 6,941,545 B1 | 9/2005 | Reese et al. | |

(Continued)

FOREIGN PATENT DOCUMENTS

EP 1091298 B1 7/2008

OTHER PUBLICATIONS

PCT/US2010/031251 International Search Report and Written Opinion mailed Oct. 18, 2010.

(Continued)

*Primary Examiner* — Yolanda L Wilson

(57) ABSTRACT

A data processing system has a trace message filtering circuit. A method includes: receiving a current page address corresponding to a current instruction in a sequence of instructions; determining that the current page address is for a different page of memory than a previous page address corresponding to a previous instruction in the sequence of instructions; comparing the current page address with a plurality of page addresses stored in a message filtering circuit; and when the current page address is determined to be different than any of the plurality of page addresses, storing the current page address in the message filtering circuit.

20 Claims, 9 Drawing Sheets

(56) References Cited

U.S. PATENT DOCUMENTS

| | | | |
|---|---|---|---|
| 7,051,237 B2 * | 5/2006 | Mayer | 714/27 |
| 7,093,236 B2 | 8/2006 | Swaine et al. | |
| 7,134,116 B1 | 11/2006 | Thekkath et al. | |
| 7,137,110 B1 | 11/2006 | Reese et al. | |
| 7,203,926 B2 | 4/2007 | Bogle et al. | |
| 7,210,072 B2 | 4/2007 | Swoboda et al. | |
| 7,219,333 B2 | 5/2007 | Agarwala et al. | |
| 7,281,237 B2 | 10/2007 | de Jong | |
| 7,346,476 B2 | 3/2008 | Levine et al. | |
| 7,434,108 B2 | 10/2008 | Moyer et al. | |
| 7,506,318 B1 | 3/2009 | Lindo et al. | |
| 7,533,302 B2 | 5/2009 | Wu | |
| 7,739,667 B2 | 6/2010 | Callahan, II et al. | |
| 7,770,156 B2 | 8/2010 | Thekkath | |
| 7,797,686 B2 | 9/2010 | Agarwala et al. | |
| 7,823,135 B2 | 10/2010 | Horning et al. | |
| 8,024,708 B2 | 9/2011 | Demetriou et al. | |
| 8,079,019 B2 | 12/2011 | Lindo et al. | |
| 8,121,828 B2 * | 2/2012 | Yates et al. | 703/26 |
| 8,166,462 B2 | 4/2012 | Kosche et al. | |
| 8,176,472 B2 | 5/2012 | Kim | |
| 2006/0036830 A1 | 2/2006 | Dinechin et al. | |
| 2006/0117224 A1 | 6/2006 | Wu | |
| 2006/0156099 A1 | 7/2006 | Sweet et al. | |
| 2008/0216073 A1 * | 9/2008 | Yates et al. | 718/100 |
| 2010/0023735 A1 | 1/2010 | Moyer | |
| 2010/0023811 A1 | 1/2010 | Moyer | |
| 2010/0023812 A1 * | 1/2010 | Moyer | 714/47 |
| 2010/0205413 A1 * | 8/2010 | Kelly et al. | 712/226 |
| 2010/0211827 A1 * | 8/2010 | Moyer et al. | 714/45 |
| 2010/0211828 A1 | 8/2010 | Moyer et al. | |
| 2010/0287417 A1 * | 11/2010 | Moyer et al. | 714/45 |
| 2012/0144167 A1 * | 6/2012 | Yates et al. | 712/216 |

OTHER PUBLICATIONS

Milenkovic et al, "Algorithms and hardware structures for unobtrusive real time compression of instruction and data address traces" IEEE DCC, pp. 1-10, 2007.

Tikir et al, "Recompilation for debugging support in a JIT compiler", ACM Paste, pp. 10-17, 2002.

Allen et al, "Serialization sets: A dynamic dependence based parallel execution model", ACM PPoPP, pp. 85-95, 2009.

Sheng et al, "RACEZ: A lightweight and non invasive race detection tool for production applications", ACM ICE, pp. 401-410, 2011.

Mayer, A. et al., "Multi-Core Debug Solution IP: SoC Software debugging and Performance Optimization," IPextreme, May 2007; printed from <<http://www.maojet.com.tw/files/PDF/IP/IPextreme.sub.—Multi-Core%- 20Debug%20Solution%20IP.pdf>> on Nov. 28, 2012; 23 pages.

* cited by examiner

PROGRAM CORRELATION TRACE MESSAGE

DIRECT BRANCH TRACE MESSAGE

DIRECT BRANCH TRACE WITH ADDRESS MESSAGE

INDIRECT BRANCH TRACE MESSAGE WITH VIRTUAL ADDRESS

INDIRECT BRANCH TRACE MESSAGE WITH PHYSICAL ADDRESS

DIRECT BRANCH TRACE MESSAGE WITH HISTORY

US 8,589,738 B2

PROGRAM TRACE MESSAGE GENERATION FOR PAGE CROSSING EVENTS FOR DEBUG

CROSS-REFERENCE TO RELATED APPLICATION(S)

This application is a continuation-in-part of U.S. patent application Ser. No. 12/435,723, naming William C. Moyer and Richard G. Collins as inventors, and assigned to the current assignee hereof.

BACKGROUND

1. Field

This disclosure relates generally to debug, and more specifically, to program trace message generation for debug.

2. Related Art

An IEEE standard known as IEEE ISTO5001, or the Nexus debug standard, is an established real-time debug standard that supports real-time debug message generation. The Nexus debug standard specifies a mechanism for identifying to an external trace reconstruction tool a predetermined operating condition within the system. Debugging processes are also used in the development of code for a data processing system. Providing debug information in real-time, without intrusion on the normal operation of the data processing system, is highly desirable to remain transparent to operation of the system.

Debug messages include trace messages that are generated by the data processing system. Trace messages can contain address and data information for either program events (program trace messaging) that relates to the execution sequence of instructions, or to data events (data read messaging, data write messaging). The address information is typically virtual address information that must be translated to identify a physical memory location known as a physical address. Correlation of virtual address information associated with debug messages to physical address information allows a debug tool a straight forward mechanism to trace programs via a listing of instructions obtained at static compile and link time that uses virtual address. However, an issue arises when such a listing is unavailable for pre-compiled software modules that are executed at runtime, such as OS cells, library functions, etc. In this case, no program listing is available making it difficult to properly trace and interpret these sections of code when executed. In such situations, the inability to deterministically translate virtual addresses to physical addresses can preclude debug message generation from being performed real-time.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

During real-time debugging, it is determined at a data processor that an instruction stream has caused a page crossing at virtual memory. In response, a program trace message containing the physical address information for the page crossing event is selectively generated in order to facilitate instruction tracing by an external trace reconstruction tool. For example, in one embodiment, the virtual page addresses of the instructions in an instruction stream being executed are compared against stored previous virtual page addresses. These stored previous virtual page addresses are page addresses which previously resulted in generation of a program trace message due to a page crossing at virtual memory. Therefore, if a match occurs, a program trace message for the current page crossing is not necessary since it already previously resulted in a program trace message which provided the physical address information for the source instruction resulting in the page crossing. However, if a match is not found, then a program trace message with the physical address information for the virtual page crossing event is generated. Also, the virtual page address of the instruction which resulted in the virtual page crossing can be stored as a previous virtual page address.

Figure 1:
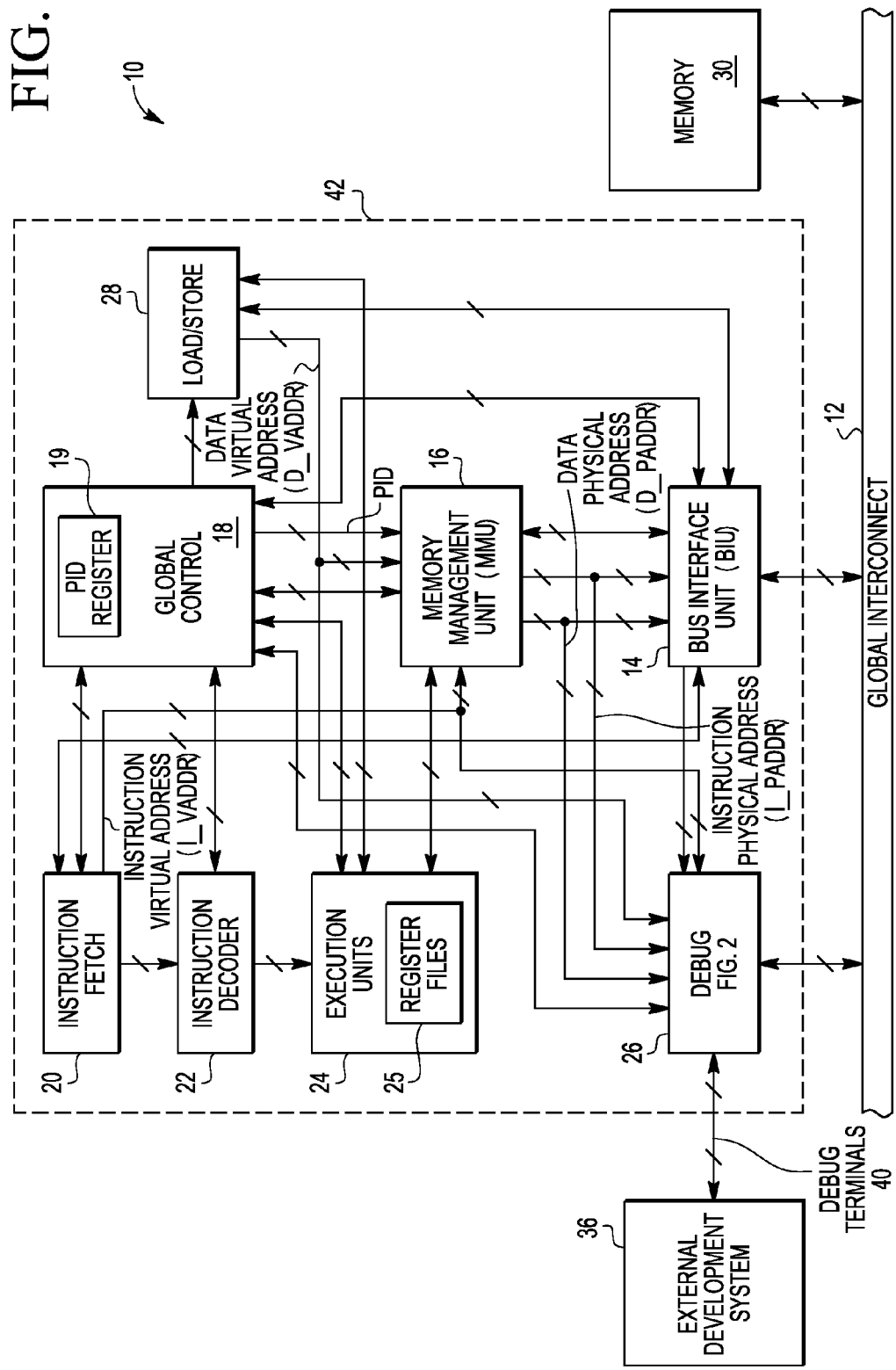
FIG. 1 illustrates in block diagram form a data processing system having debug message generation in accordance with one form of the present disclosure.

Illustrated in FIG. 1 is a data processing system 10 that supports trace messaging during real-time debugging. Within data processing system 10 is a global interconnect 12. In one form global interconnect 12 is a system bus. Other forms of interconnect may be used including, for example, crossbars, point-to-point connections, and optical and wireless transmission techniques. A bus interface unit (BIU) 14 is coupled to global interconnect 12 via a bidirectional coupling. In one form the bidirectional coupling is a bidirectional multiple conductor bus wherein multiple conductor buses herein are represented with a slash across the conductor. BIU 14 is bidirectionally coupled to memory management unit (MMU) 16. MMU 16 is coupled to a first input/output terminal of a global control circuit 18 via a bidirectional multiple conductor bus. A second input/output terminal of global control circuit 18 is coupled to a first input/output terminal of an instruction fetch unit 20 via a bidirectional multiple conductor bus. Instruction fetch unit 20 has an output coupled to an input of an instruction decoder 22 via a multiple conductor bus. An output of instruction decoder 22 is coupled to an input of execution units 24. In one form execution units 24 include at least one arithmetic logic unit, at least one floating point unit and at least one multiplier circuit. Within the execution units 24 are register files 25. An input/output terminal of instruction decoder 22 is coupled to a third input/output terminal of the global control circuit 18. A first input/output terminal of execution units 24 is coupled to a fourth input/output terminal of global control circuit 18. Execution units 24 and instruction fetch unit 20 are also bidirectionally coupled to MMU 16. Debug module 26 includes trace message request logic 62 and has an input/output terminal coupled to a fifth input/output terminal of global control circuit 18. A load/store unit 28 has a first input/output terminal bidirectionally coupled to a sixth input/output terminal of global control circuit 18. Load/store unit 28 has a second input/output terminal coupled to a first input/output terminal of BIU 14. Load/store unit 28 has a third input/output terminal coupled to a second input/output terminal of execution units 24. A second input/output terminal of BIU 14 is coupled to a seventh input/output terminal of global control circuit 18. An output of load/store unit 28 provides a data virtual address (D_VADDR) and is coupled to a first input of MMU 16 and a first input of debug module 26. An output of instruction fetch unit 20 provides an instruction virtual address (I_VADDR) and is coupled to a second input of MMU 16 and a second input of debug module 26. A first output of MMU 16 provides a data physical address (D_PADDR) and is coupled to a first input of BIU 14 and to a third input of debug module 26. A second output of MMU 16 provides an instruction physical address (I_PADDR) and is coupled to a second input of BIU 14 and to a fourth input of debug module 26.

A memory 30 is coupled to global interconnect 12 via a bidirectional coupling. Debug module 26 has a second input/output terminal coupled to a plurality of debug terminals 40 via bidirectional multiple conductors. The plurality of debug terminals 40 are coupled to an external development system 36 that is an external debug tool commonly referred to as a debugger or external debugger. In the illustrated form BIU 14, MMU 16, global control circuit 18, instruction fetch unit 20, instruction decoder 22, execution units 24 with register files 25, debug module 26 and load/store unit 28 collectively form a data processor 42 as indicated by the dashed line grouping in FIG. 1. While global control circuit 18 is illustrated in FIG. 1 in a segregated location, it should be well understood that the module and functional control of global control circuit 18, as well as that of other modules, may also be implemented in a distributed manner and be included within any of the various other system blocks of data processing system 10. For example, the storage locations 602 illustrated at the debug control module 60 of FIG. 3 can include register fields that are part of control circuit 18 and register files 25. Also, in the illustrated embodiment, global control 18 includes a process identifier (PID) register 19 that stores a process identifier (PID) for the currently executing process. Global control 18 also provides the PID to MMU 16.

In operation, data processing system 10 communicates with devices (not shown) via global interconnect 12. Information communicated with data processor 42 transfers through BIU 14. Instruction fetch unit 20 retrieves data processor instructions (i.e. processor instructions) from BIU 14 under control of global control circuit 18. The retrieved instructions are sequentially communicated to instruction decoder 22 for decoding under control of global control circuit 18. Execution units 24 execute instructions and generate data that is either stored in a cache (not shown) or placed in the memory 30 via coupling through global control circuit 18, BIU 14 and global interconnect 12. Debugging of the operation of data processor 42 and data processing system 10 is performed by the use of debug module 26 that generates debug messages for analysis by external development system 36. A test or debug mode of operation is entered in response to activation of such from external development system 36. In the illustrated form, debug module 26 is configured to receive data virtual addresses, data physical addresses, instruction virtual addresses, instruction physical addresses, data information from BIU 14 and load/store unit 28, and information from global control 18. A data address is an address where data resides whereas an instruction address is an address where an instruction resides. Instruction virtual addresses are provided from instruction fetch unit 20 to the debug module 26 and MMU 16. A virtual address (also referred to as a logic address) is an un-translated address which requires some further processing or translating to obtain a translated address of the physical storage location where the information is residing. This translated address is referred to as the physical address. MMU 16 provides instruction physical addresses to BIU 14 and debug module 26 by translating addresses of virtual pages of memory to corresponding physical page addresses. Pages of memory are contiguous locations which are grouped, and typically have a size that is a power of 2, such as for example a 4 Kbyte page, a 16 Kbyte page, a 64 Kbyte page, etc. Load/store unit 28 provides data virtual addresses to debug module 26 and to MMU 16. MMU 16 provides data physical addresses to BIU 14 and debug module 26. Debug module 26 forms a debug message for external development system 36 based upon information at one or more of the received addresses, as will be discussed in more detail below. The format of debug messages may vary and examples will be discussed below in connection with FIGS. 5-7 and 9-11.

Figure 2:
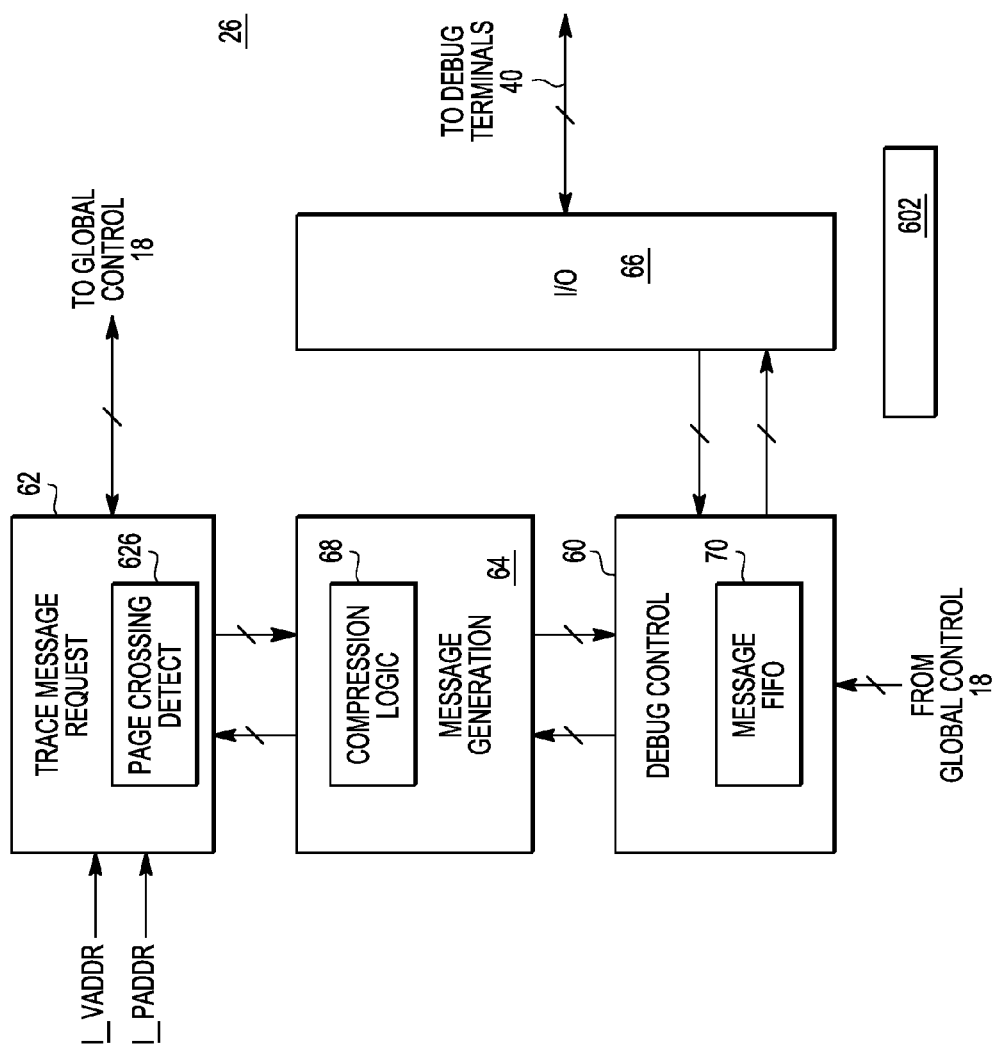
FIG. 2 illustrates in block diagram form a debug module of FIG. 1 in accordance with one form of the present disclosure.

Illustrated in FIG. 2 is an exemplary embodiment of a portion of the debug module 26 of FIG. 1 that includes debug control module 60, trace message request module 62, message generation module 64, storage locations 602 and input/output (I/O) module 66. Debug control module 60 includes a first-in first-out storage circuit (FIFO) 70 and is bidirectionally coupled to message generation module 64 and I/O module 66. Debug control module 60 also receives information from global control circuit 18, register files 25, and the like, which can include register information represented by storage location 602. I/O module 66 is bidirectionally coupled to debug terminals 40. Trace message request module 62 is bidirectionally coupled to message generation module 64, and includes page crossing detect module 626. Trace message request module 62 is coupled to instruction physical address (I_PADDR), to instruction virtual address (I_VADDR), and to global control 18.

During debug operation, trace message request module 62 is the logic module that determines when a synchronization event, such as a trace message of a predetermined format, is to be generated by message generation module 64. Message generation module 64 generates certain debug messages based on a message generation request from trace message request module 62. Compression module 68 may perform message compression on parts or all of the messages generated by message generation module 64. Generated messages are provided to debug control module 60 where they are stored in message FIFO 70 before being transmitted. From message FIFO 70, the debug messages are routed to debug terminals 40 via I/O module 66.

In one embodiment, trace message request module 62 includes page crossing detect module 626 that monitors the instruction stream at the physical and virtual buses to determine when a page crossing occurs from one page of memory to another, thereby allowing the trace message request module 62 to determine whether to request a debug message be generated that includes physical address information for the instruction of the instruction stream in the new physical page for the physical page crossing. Note that page crossing detect module 626 can detect both physical page crossings and virtual page crossings. Trace message request module 62 and page crossing detect module 626 will be further understood with reference to FIGS. 3-15.

Figure 3:
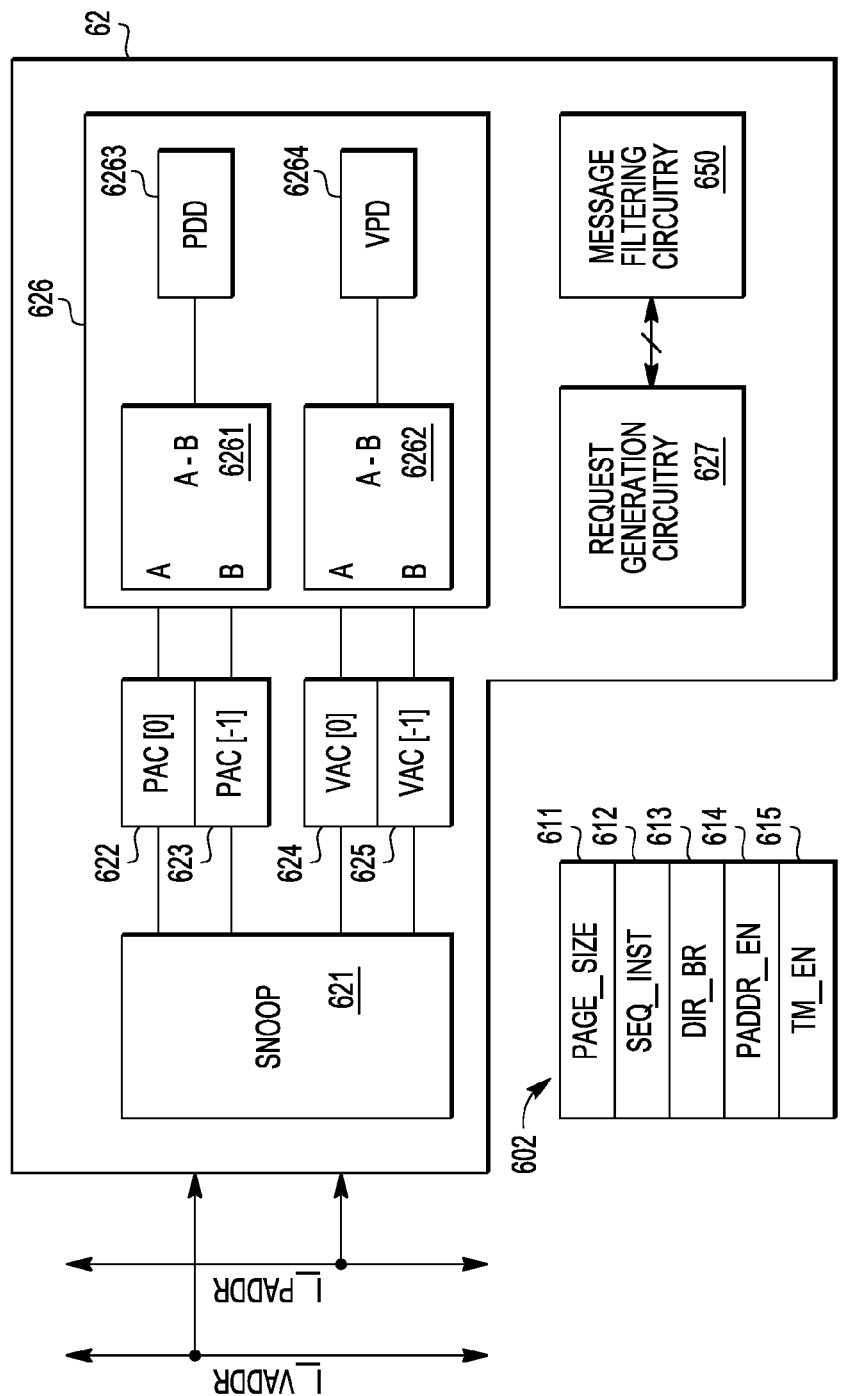
FIG. 3 illustrates in block diagram form a trace message request module of FIG. 2 in accordance with one form of the present disclosure.

Illustrated in FIG. 3 is one embodiment of portions of trace message request module 62 and storage location 602. The portions of trace message request module 62 includes snoop module 621, storage location 622, storage location 623, storage location 624, storage location 625, page crossing detect module 626, request generation module 627, and message filtering circuitry 650. Page crossing detect module 626 includes compare module 6261, compare module 6262, storage location 6263, and storage location 6264. Storage location 602 is illustrated to include storage locations 611-615, which can represent register fields. Storage location 611 stores information labeled as PAGE_SIZE that indicates the memory page size. Storage location 612 stores information labeled SEQ_INST that when asserted indicates that the currently executed instruction is consecutive in virtual address space to the previously executed instruction, thereby indicating that the current instruction was not executed as the result of a branch being taken or an exception being encountered. Storage location 613 stores information labeled DIR_BR that when asserted indicates that the current instruction was executed as the result of a direct branch being taken. Storage location 614 stores information labeled PADDR_EN that when asserted indicates that physical address reporting is enabled. Storage location 615 stores information labeled TM_EN that when asserted indicates debug module 26 is to generate trace messages.

Snoop module 621 is connected to bus I_VADDR, bus I_PADDR, and storage locations 622-625. Storage locations 622 and 623 are connected to compare module 6261. Storage locations 624 and 625 are connected to compare module 6262. Page crossing detect module 626 is connected to request generation module 627 (not shown). Storage locations 611-615, are connected to trace message request module 62 (not shown).

During operation, snoop module 621 monitors the information on bus I_VADDR and on bus I_PADDR, e.g., snoops buses I_VADDR and I_PADDR, to determine the physical and virtual address of each requested instruction. The physical address associated with a current instruction at bus I_PADDR is labeled "PAC[0]" and is stored at storage location 622. The physical address associated with the previous instruction accessed at bus I_PADDR is labeled "PAC[-1]" and is stored storage location 623. The virtual address associated with the current instruction that translates to PAC[0] is retrieved from bus I_VADDR, is labeled "VAC[0]", and stored at storage location 624. The virtual address associated with the current instruction that translates to PAC[-1] is retrieved from bus I_VADDR, is labeled "VAC[-1]," and is stored at storage location 625 It will be appreciated that due to prefetching that instructions may be accessed that are not executed. However, for purposes of description herein, prefetching is ignored and it is assumed that instructions are executed in the order accessed.

Compare module 6261 of page crossing detect module 626 compares the physical addresses of the current instruction to that of the sequentially executed previous instruction to determine if the current instruction of the instruction execution stream caused a physical page of memory to be crossed (i.e. a physical page crossing). An offset between accessed physical pages can be determined at compare module 6261 by the equation:

$$\text{Physical Page Offset} = (PAC[0]/\text{PAGE\_SIZE}) - (PAC[-1]/\text{PAGE\_SIZE}),$$

where PAGE_SIZE is the page size of each page of memory stored at storage location 611, and based on PAGE_SIZE, the low order page index bits of PAC[0] and PAC[1] are discarded, and a comparison made of the remaining high-order page frame address bits to determine if a physical page crossing has occurred. PAGE_SIZE can be programmable, and in one embodiment, can change dynamically based on each address translation performed by MMU 16. A non-zero page offset indicates a page crossing has occurred at physical memory. The physical page offset calculated at compare module 6261 is stored at storage location 6263 and indicates the number of physical pages crossed, where a value of zero [0] indicates no physical page was crossed.

Compare module 6262 of page crossing detect module 626 compares the virtual addresses of sequentially executed instructions to determine if the instruction execution stream caused a virtual page of memory to be crossed (i.e. a virtual page crossing). This can be determined by implementing the equation:

$$\text{Virtual Page Offset} = (VAC[0]/\text{PAGE\_SIZE}) - (VAC[-1]/\text{PAGE\_SIZE}).$$

where based on PAGE_SIZE, the low order page index bits of VAC[0] and VAC[1] are discarded, and a comparison made of the remaining high-order virtual page frame address bits to determine if a virtual page crossing has occurred. PAGE_SIZE can be programmable, and in one embodiment, can change dynamically based on each address translation performed by MMU 16. A non-zero page offset indicates a page boundary crossing has occurred at virtual memory. The virtual page offset calculated at compare module 6262 is stored at storage location 6264 and indicates the number of virtual pages crossed, where a value of zero [0] indicates no virtual page boundary was crossed. The offset information can be used by message request module 627 to determine whether a message request is to be sent to message generation module 64. Also, message request module 627 may receive further information from message filtering circuitry 650 to determine whether a message request is to be sent.

Figure 4:
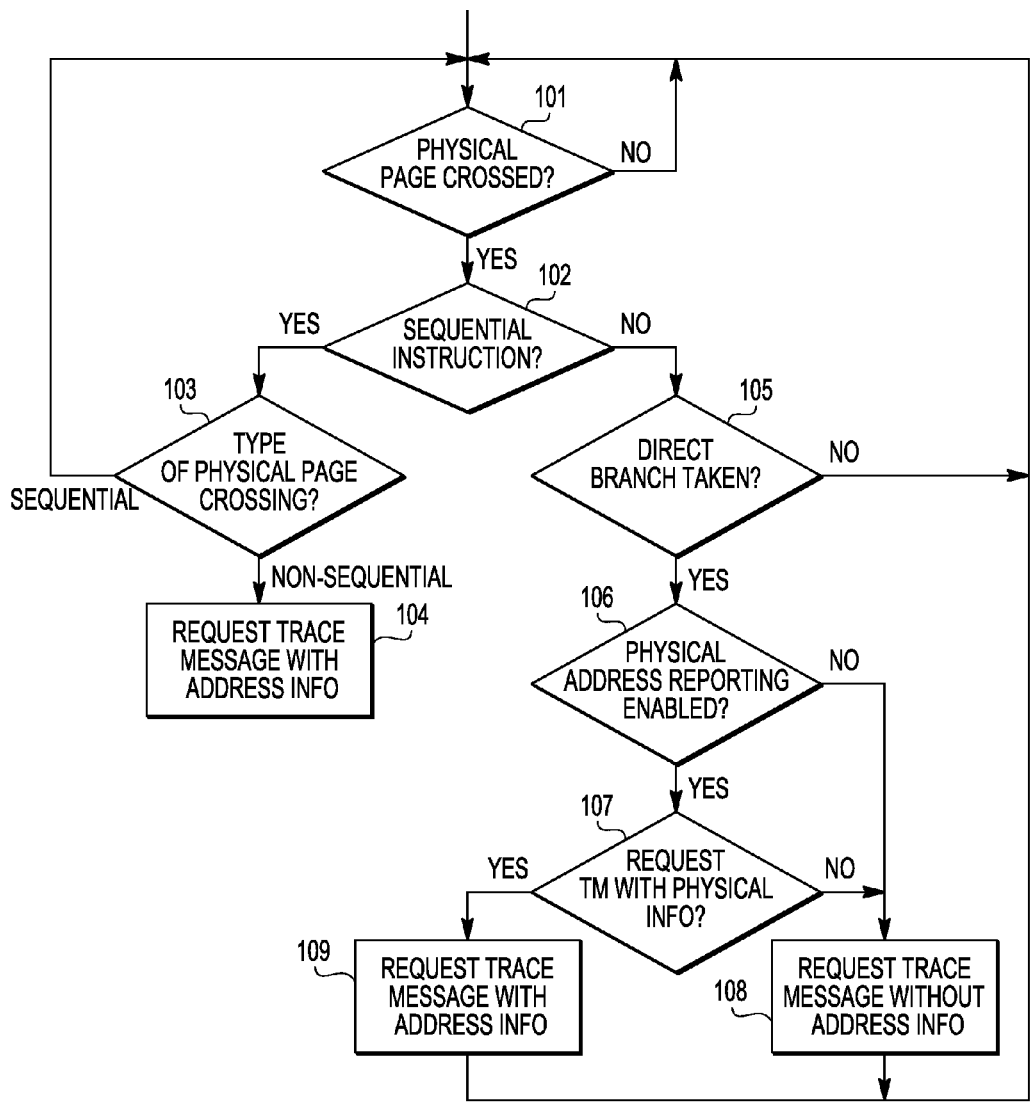
FIG. 4 illustrates in flow diagram form a method in accordance with one form of the present disclosure.

Illustrated at FIG. 4 is one example of a method implemented by message request module 626 that is used when trace messaging is enabled, e.g., when TM_EN at storage location 615 is asserted, to determine when to send a request to message generation logic 64 to generate a trace message. At block 101 it is determined whether a physical page boundary has been crossed. As previously described, a non-zero value of PPD at storage location 6263 is indicative of a physical page boundary having been crossed. For example, PPD will have a non-zero value when a current access is to a first physical address of the physical memory and a previous access is to a second physical address of physical memory that is at a different page. When a physical page is crossed flow proceeds to block 102, otherwise, flow returns to block 101.

At block 102 it is determined whether the current instruction that caused the physical page crossing is sequential in virtual memory with the previous instruction. It will be appreciated that instructions that are sequential in virtual memory are stored at consecutive virtual memory locations, and, therefore, executed back-to-back unless a branch is taken or exception occurs. At trace message request module 62, SEQ_INST at storage location 612 is asserted to indicate that the current instruction is sequential in virtual memory with the previous instruction when asserted. When the current instruction is sequential in virtual memory to the previous instruction, flow proceeds to block 103 from block 102, otherwise flow proceeds to block 105.

At block 103 the type of page crossing is determined. For example, in response to the type of page crossing being a sequential page crossing, flow returns to block 101, and in response to the type of page crossing being a non-sequential page crossing flow proceeds to block 104. As used herein, a sequential page crossing occurs when the smallest address of a current page being accessed is consecutive with the largest address of the previously accessed page. As used herein, a non-sequential page crossing occurs when the smallest address of a current page being accessed is not consecutive with the largest address of the previously accessed page. For example, in the embodiment described at FIG. 3, a PPD value of one (1) indicates that the physical page crossing that occurred was a sequential page crossing. Flow proceeds to block 101 when the detected physical page crossing was a sequential page crossing. Flow proceeds to block 104 when the detected physical page crossing was a non-sequential page crossing, such as when a previous page is accessed, e.g., indicated by a negative PPD value, or when the sequential page in physical memory is skipped, e.g., indicated by a value of PDD greater than one (1).

At block 104, a request to generate a trace message with an address indicator is generated as will be discussed in greater detail below. Referring back to block 102, flow proceeds to block 105 when the current instruction is not sequential in virtual memory with the previous instruction. For example, flow will proceed to block 105 in response to the current instruction being executed as the result of a branch being taken or an exception occurring. At block 105, it is determined whether the current instruction is executed as a result of a direct branch being taken. A direct branch is a branch whose target is directly provided with the instruction, such as by an offset value, and thus is typically a static value that can be determined by the debugger based on knowledge of the program instruction values. In the embodiment described at FIG. 3, DIR_BR is asserted at storage location 613 in response to the previous instruction being a direct branch that was taken, thereby causing the current instruction to be executed, e.g., the current instruction is not sequential in virtual memory with the previous instruction. If the non-sequential instruction flow was the result of a direct branch instruction, flow proceeds to block 106, otherwise flow returns to block 101.

At block 106 a determination is made whether physical address reporting is enabled. For example, PADDR_EN at storage location 614 can indicate whether physical addressing is enabled. When enabled, flow proceeds to block 107, otherwise flow proceeds to block 108 where a trace message, such as a direct branch trace message, is generated without physical address information as described in greater detail below.

At block 107, a determination is made whether a criteria is met indicating a trace message (TM) with physical address information should be requested. If so, flow proceeds to block 109, otherwise flow proceeds to block 108. In one embodiment, the criteria is met when the physical and virtual pages have been incremented by different amounts, i.e., when PPD≠VPD, as a result of the current instruction being executed, which is indicative of the current physical page having a different offset from the previous physical page than the current virtual page's offset from the previous virtual page. In another embodiment, the criteria at block 107 is met when the physical and virtual pages are incremented by different amounts or when the physical and virtual pages are incremented by the same amount that is outside of a desired range. For example, flow can proceed to block 109 when ((PPD≠VPD) or when (|PPD|>N)), where N is a positive integer. For example, in one embodiment, N=1, whereby any direct branch causing a new physical page to be accessed other than a next page in sequence, e.g., PPD=1, or a previous page in sequence, e.g., PPD=−1, will cause flow to proceed from block 107 to block 109. In another embodiment, the criteria is met any time a physical page boundary is crossed.

Figure 5:
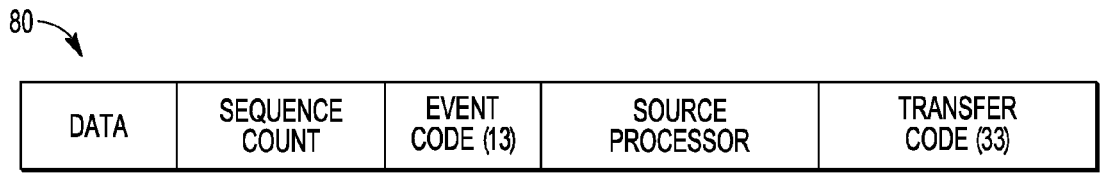
FIG. 5 illustrates in diagram form an exemplary trace message in accordance with one form of the present disclosure.
Figure 6:
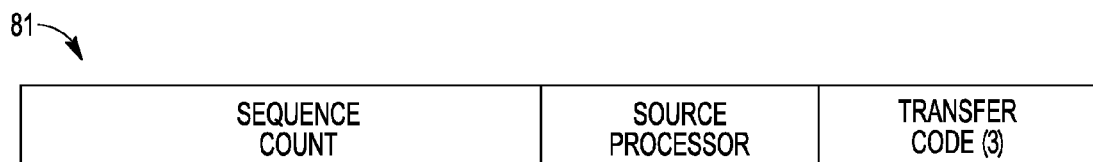
FIG. 6 illustrates in diagram form an exemplary trace message in accordance with one form of the present disclosure.
Figure 7:
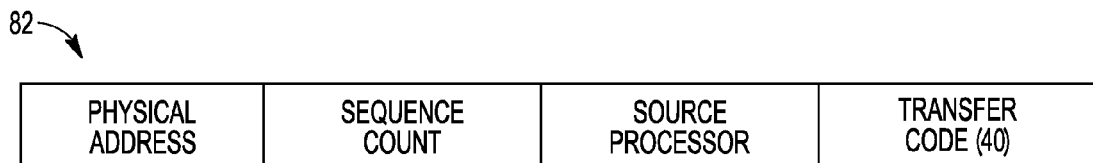
FIG. 7 illustrates in diagram form an exemplary trace message in accordance with one form of the present disclosure.

When the flow of the method illustrated at FIG. 4 is to block 104, block 108, or block 109, a request to generate a trace message is generated. For example, a trace message that includes physical address information will be requested at block 104 in response to instructions that are sequential in virtual memory causing a non-sequential page crossing. FIGS. 5-7 illustrate various TRACE MESSAGES that can be generated. In one embodiment, as will be described in more detail below in reference to FIGS. 13-15, further criteria is used, such as by message filtering circuitry 650, to determine whether a trace message in response to the page crossing will be generated.

FIG. 5 illustrates an example of a trace message 80 referred to as a Program Trace Correlation message, that can be requested at block 104 to facilitate synchronization during program trace. The trace message 80 contains a field labeled TRANSFER CODE (TCODE), a field labeled "SOURCE PROCESSOR", a field labeled "EVENT CODE", a field labeled "SEQUENCE COUNT", and a field labeled "DATA". The field TRANSFER CODE includes a value associated with the message to identify the trace message 80 as a specific type of debug message, e.g., as a PROGRAM TRACE CORRELATION MESSAGE, that is understood to have a particular predetermined field format. The TRANSFER CODE field is useful when trace messages with different field formats can be sent. The trace message 80 has a TRANSFER CODE value of 33 to indicate that the message is a Program Trace Correlation Message, which is a known type of trace message. The field SOURCE PROCESSOR identifies the processor in a multi-processor system to which the trace message 80 is associated. The field EVENT CODE identifies an event that caused the trace message 80 to be generated. In accordance with the present embodiment, the current EVENT CODE has a value of 13 to indicate the message is being generated due to non-sequential physical pages being crossed, e.g., PPD≠1, in response to an instruction that is sequential in virtual memory space to the previous instruction being executed. The table below indicates other events that can result in trace message 80 being generated.

TABLE 13-6

Event Code Encoding (TCODE = 33)

| Event Code | Description |
| --- | --- |
| 0000 | Entry into Debug Mode |
| 0001 | Entry into Low Power Mode (CPU only) |
| 0010-0011 | Reserved |
| 0100 | Disabling Program Trace |
| 0101-1000 | Reserved |

TABLE 13-6-continued

Event Code Encoding (TCODE = 33)

| Event Code | Description |
| --- | --- |
| 1001 | Begin masking of program trace messages based on register setting |
| 1010 | Branch and link occurrence (direct branch function call) |
| 1011-1100 | Reserved |
| 1101 | Non-Sequential physical page address change of flow due to sequential instruction flow |
| 1110 | Trace disable or entry into a VLE page from a non-VLE page |
| 1111 | End of VLE tracing (trace disabled or entry into a non-VLE page from a VLE page) |

The field SEQUENCE COUNT contains a value that represents a number of instructions that have been executed since the last trace message was generated. In response to the trace message 80 having an EVENT CODE of 13, which indicates the message is being non-sequential physical pages being crossed, the field DATA will be treated the same as the field PHYSICAL DATA as described below, whereby the message generation module will include the physical address information at field DATA that identifies the location in physical memory of the current instruction.

FIG. 6 illustrates an example of a currently existing trace message 81, referred to as a Direct Branch Message that can be requested at block 108 to maintain synchronization during program trace. Flow transitioned to block 108 in response to physical address reporting being disabled, or in response to a direct branch being taken that did not meet the criteria of block 107 as needed to flow to block 109 where a trace message with address information is requested. The trace message 81 contains the fields TRANSFER CODE, SOURCE PROCESSOR, and SEQUENCE COUNT as previously described. The TRANSFER CODE value for trace message 81 is three (3). Note that the trace message 81 is also requested by the debug module 26 in response to a direct branch being taken that does not cross a physical page boundary. Note that no DATA field is included, since the debugger can determine the destination of the branch based solely on the content of the instruction encoding itself and knowledge of the location in memory of the direct branch instruction. For these cases, trace bandwidth can be conserved, since no additional address location information needs to be transmitted.

At block 109 the criteria at block 107 was met and therefore, a trace message with address information is requested. FIG. 7 illustrates an example of a message 82, referred to as a Direct Branch Message with Address that can be requested at block 109 to keep synchronization during program trace. The trace message 82 contains the fields TRANSFER CODE, SOURCE PROCESSOR, SEQUENCE COUNT, as previously described, and an additional field labeled "PHYSICAL ADDRESS". The field PHYSICAL ADDRESS can include, a representation, in compressed or uncompressed form, of: the entire physical address, e.g., the full target address; an offset, e.g., a relative address, that when added to the physical address of the previously reported physical address equals the current physical address; or a portion of the current physical address, e.g., some portion of the least or most significant bits.

Figure 8:
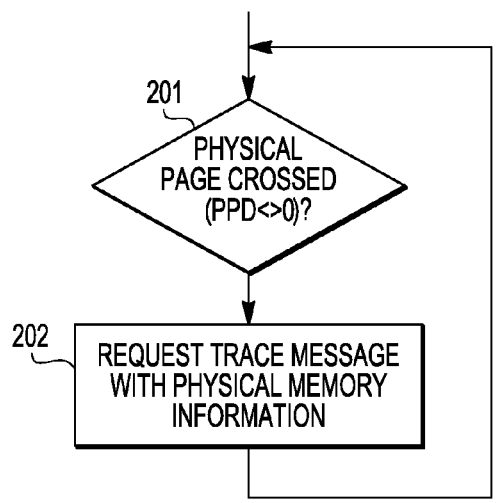
FIG. 8 illustrates in flow diagram form a method in accordance with one form of the present disclosure.
Figure 9:
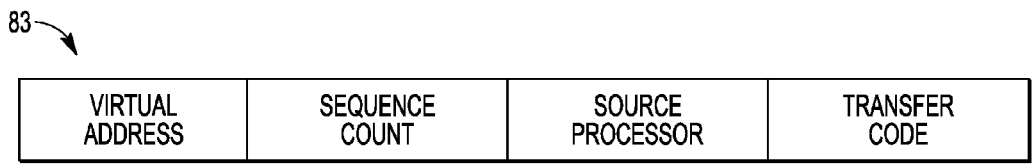
FIG. 9 illustrates in diagram form an exemplary trace message in accordance with one form of the present disclosure.
Figure 10:
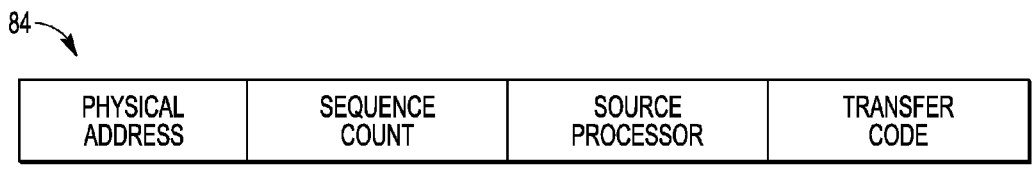
FIG. 10 illustrates in diagram form an exemplary trace message in accordance with one form of the present disclosure.

By now it should be appreciated that there has been provided a data processing system having efficient real-time debug addressing by generating trace messages that selectively include physical address information in response to a physical page crossing determination. It will be appreciated that many variations of generating trace messages that include physical address information can be envisioned. For example, FIG. 8 illustrates a flow diagram of an embodiment, whereby a trace message with address information is generated anytime that a physical address page is crossed. For example, a trace message 80 as described at FIG. 5 can be generated.

In another embodiment, while the specific embodiment described above has been in reference to a direct branch, it will be appreciated that the described techniques can include other types of branches as well. For example, when the branch is an indirect branch, an indirect branch trace message with a physical address information, such as the branch message 83 that illustrated at FIG. 9, can be requested in response to PADDR_EN being set, and the indirect branch trace message can be requested with virtual address information, such as the branch message 84 that illustrated at FIG. 10, in response to PADDR_EN being cleared.

Figure 11:
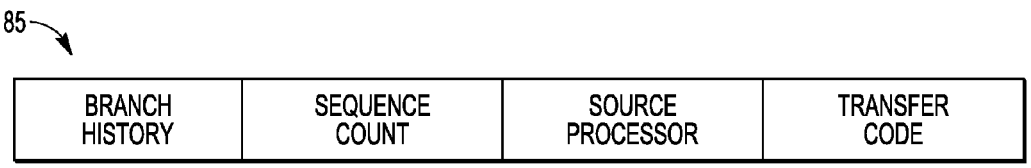
FIG. 11 illustrates in diagram form an exemplary trace message in accordance with one form of the present disclosure.

In yet another embodiment, the requested trace message that includes the physical address information can also include trace history information, for example, in response a trace history indicator being enabled. FIG. 11 illustrates an example of a direct branch trace message 85 with history that includes a branch history field. The branch history field contains a plurality of 1-bit values, where, for each direct branch taken since the last program trace message, a corresponding 1-bit value is set or cleared to indicate whether the direct branch was taken or not taken. It will be appreciated that other types of trace messages, such as indirect trace messages, can also include the branch history field as described.

As described above, such as in reference to the method of FIG. 4, a trace message may be generated in response to particular physical page crossing events. However, for certain program segments, such as for code loops that straddle a page boundary or for a control loop that branches among a small number of pages, multiple trace messages may be generated within a very short period of time, which can potentially become a bottleneck for the trace resources. Therefore, in order to prevent the bottleneck, a message filtering module may be used such that a trace message is only selectively generated in response to a page crossing event. In one embodiment, storage circuitry, such as a FIFO, is used to keep track of recent page crossings. The information in this storage circuitry can then be used to determine which page crossing events result in generation of a trace message. For example, this storage circuitry may store recent mapping information by storing the last "n" translation crossings. In this manner, the page crossing information with the proper physical address information would be sent once and filtered so long as it remained stored in this storage circuitry.

Figure 12:
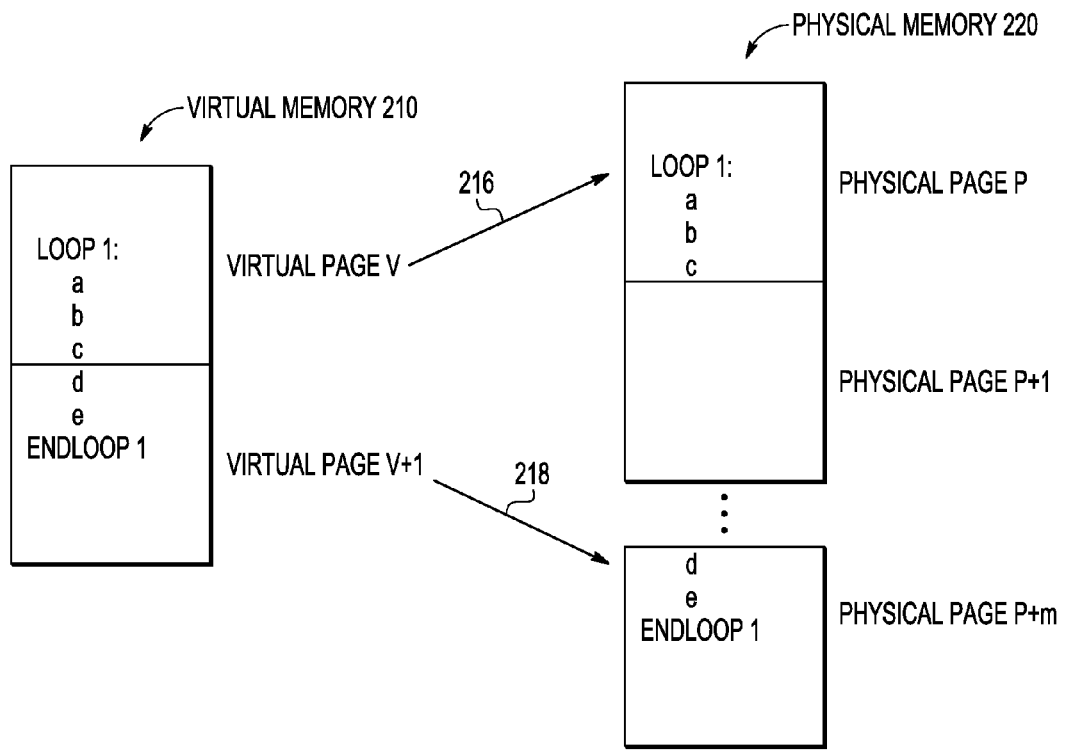
FIG. 12 illustrates in diagram form an exemplary virtual memory to physical memory mapping in accordance with one form of the present disclosure.

For example, FIG. 12 illustrates an example of a memory mapping which may be implemented MMU 16. FIG. 12 illustrates a portion of virtual memory 210 and a portion of physical memory 220, where physical memory 220 is representative of how information is actually stored in physical locations of the memory, such as memory 30. In the illustrated embodiment, virtual page V is mapped to physical page P, as illustrated by arrow 216, and virtual page V+1 (which is adjacent to virtual page V) is mapped to physical page P+M, as illustrated by arrow 218. Note that M>1, such that physical page P+M is not adjacent to physical page P. Also illustrated in FIG. 12. is physical page P+1 which is adjacent to physical page P (and is sequential to physical page P). Therefore, note that loop 1 includes instructions a-e which straddle a virtual page boundary between virtual pages V and V+1. However, the instructions c and d, although they cross a virtual page boundary, are sequential to each other in virtual memory.

Since virtual pages V and V+1 are mapped to non-adjacent (and non-sequential) physical pages P and P+M, respectively, instruction c and d are not sequential in physical memory. Therefore, as described above, when instruction d is executed, it may be desirable to generate a program trace message with physical address information for instruction d which resides in a physical page that is non-adjacent to the physical page which contains instruction c. Similarly, when the end of the loop, endloop1, is reached and instruction flow branches back to the beginning of Loop1, it may also be desirable to generate a program trace message with physical address information for instruction a since instruction a resides in a physical page that is non-adjacent (and non-sequential) to the physical page which contains instruction e. (Note that the format of the program trace messages which are generated in these examples may be like the indirect branch message format illustrated in FIG. 10 above.) However, once Loop1 is executed once, the memory mappings provided by these program trace messages which provide physical address information for the instruction which caused a physical page crossing is known, and these messages need not be generated each time Loop1 is executed. Therefore, as will be described below in reference to FIGS. 13-15, virtual or physical page crossings may be monitored to appropriately determine when, in response to such page crossings, a program trace message having physical address information should be generated.

Figure 13:
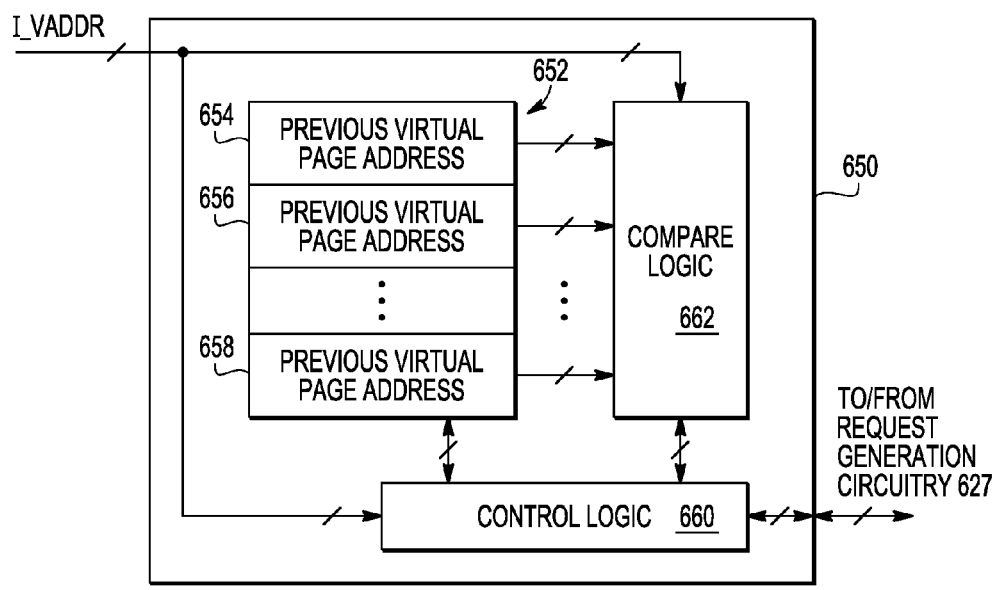
FIG. 13 illustrates in block diagram form message filtering circuitry of FIG. 3 in accordance with one form of the present disclosure.

FIG. 13 illustrates a portion of message filtering circuitry 650 in accordance with one embodiment of the present disclosure. Message filtering circuitry 650 includes storage circuitry 652, compare logic 662, and control logic 660. compare logic 662 and control logic 660 each receive I_VADDR, and control logic is bidirectionally coupled to storage circuitry 652, compare logic 662, and request generation circuitry 627. Storage circuitry 652 includes one or more entries, such as entries 654, 656, and 658, in which each entry stores a previous virtual page address. These previous virtual page addresses indicate the virtual page address of an instruction which was executed, resulted in a virtual page crossing, and resulted in a program trace message to be generated for providing the corresponding physical address information for the instruction. For each instruction in the instruction stream being executed by data processor 42, compare logic 662 receives the virtual address via I_VADDR. Compare logic 662 uses I_VADDR to determine the virtual page address of the currently execution instruction and compares the virtual page address to each previous virtual page entry within storage circuitry 652. Control logic 660, using the result of this comparison by compare logic 662, can then indicate to request generation circuitry 627 whether a program trace message with physical address information should be requested when a page crossing event occurs due to instruction execution.

Figure 14:
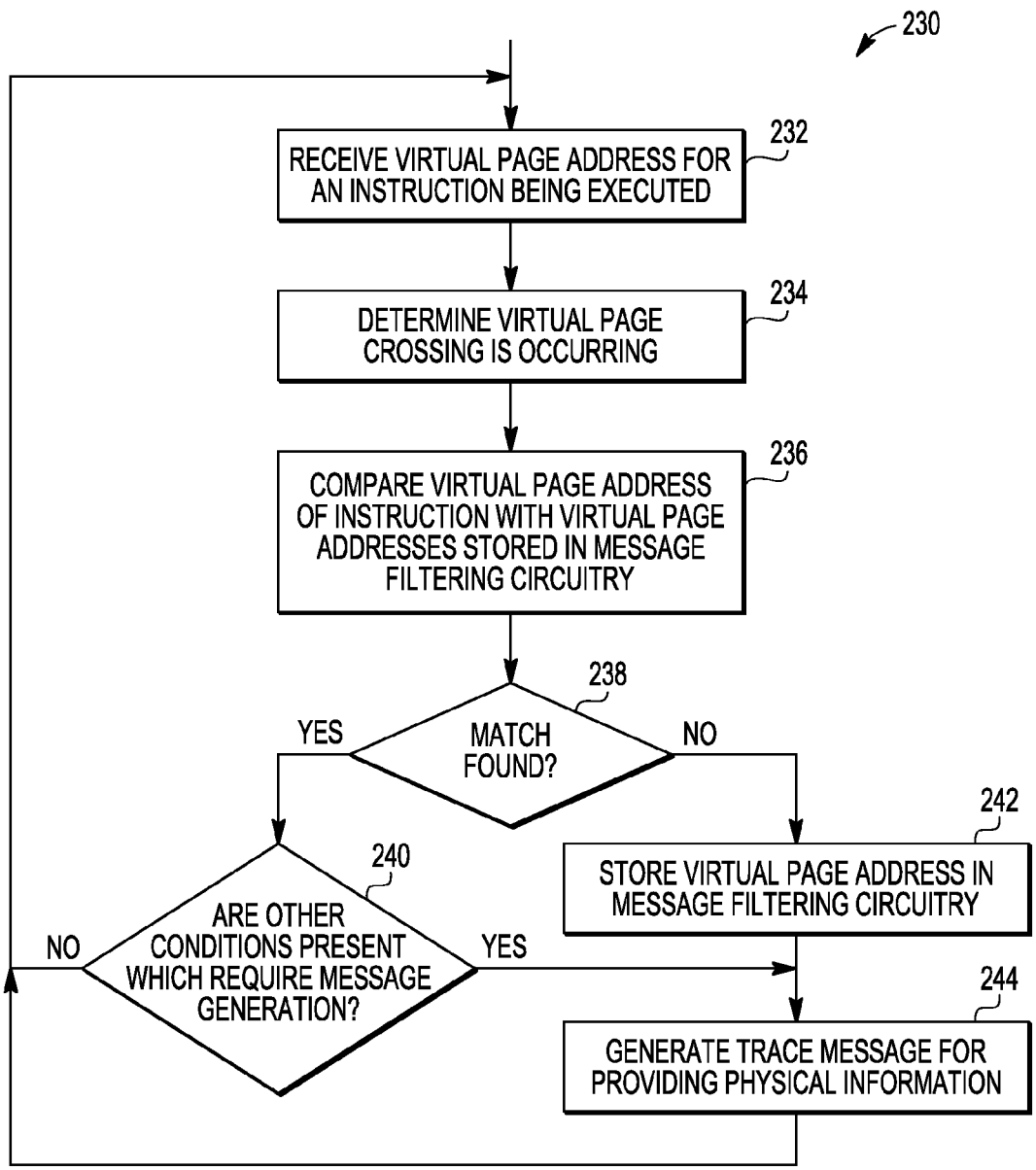
FIG. 14 illustrates in flow diagram form a method in accordance with one form of the present disclosure.

FIG. 14 illustrates a method 230 for selectively generating a program trace message with physical address information in accordance with one embodiment of the present disclosure. In block 232, a virtual page address for an instruction being executed is received. As described above, the virtual address of an instruction being executed is received by message filtering circuitry 650 via I_VADDR, and from the virtual address, the virtual page address may be determined (such as by using a higher order portion of the virtual address). Flow then proceeds to block 234 where it is determined whether a virtual page crossing is occurring. For example, this determination can be performed by using circuitry 624, 625, 6262, and 6264, described above in reference to the embodiment of trace message request circuitry 62. Flow then proceeds to block 236 in which the virtual page address of the currently executing instruction is compared with the virtual page addresses stored in storage circuitry 652. As discussed above, this comparison may be performed by compare logic 662.

Flow then proceeds to decision diamond 238 in which it is determined if a match occurred. If no match occurred, then flow proceeds to block 242 where the virtual page address of the currently executing instruction is stored in storage circuitry 652. In one embodiment, storage circuitry 652 is implemented as a first-in first-out (FIFO) buffer in which the new virtual page address stored in block 242 replaces the oldest entry in time. In alternate embodiments, storage circuitry 652 may be implemented in other ways. For example, a least recently used (LRU) table may be used in which the new virtual page address stored in block 242 replaces an entry that has been least recently matched. After block 242, flow proceeds to block 244 in which a trace message is generated for the virtual page crossing which provides physical address information of the executed instruction which resulted in the virtual page crossing. Flow then returns to block 232.

At decision diamond 238, if a match is found, flow proceeds to decision diamond 240. Note that if a match is found, then a program trace message with physical address information is not needed to obtain the physical mapping corresponding to the virtual page boundary because it was already provided in a previous program trace message. However, at decision diamond 240, it is determined if there are other conditions present which require a program trace message to be generated. These conditions may include, for example, overflow of a branch history buffer, or determining that a predetermine interval of time has occurred since the last time one or more types of trace messages has been generated, or that a predetermined number of instructions has been executed since the last time one or more types of trace messages has been generated. If any of these conditions are present, flow proceeds to block 244 in which a trace message for providing the physical address information and other related information for the page crossing is generated. However, if no other conditions are present, flow returns to block 232.

Figure 15:
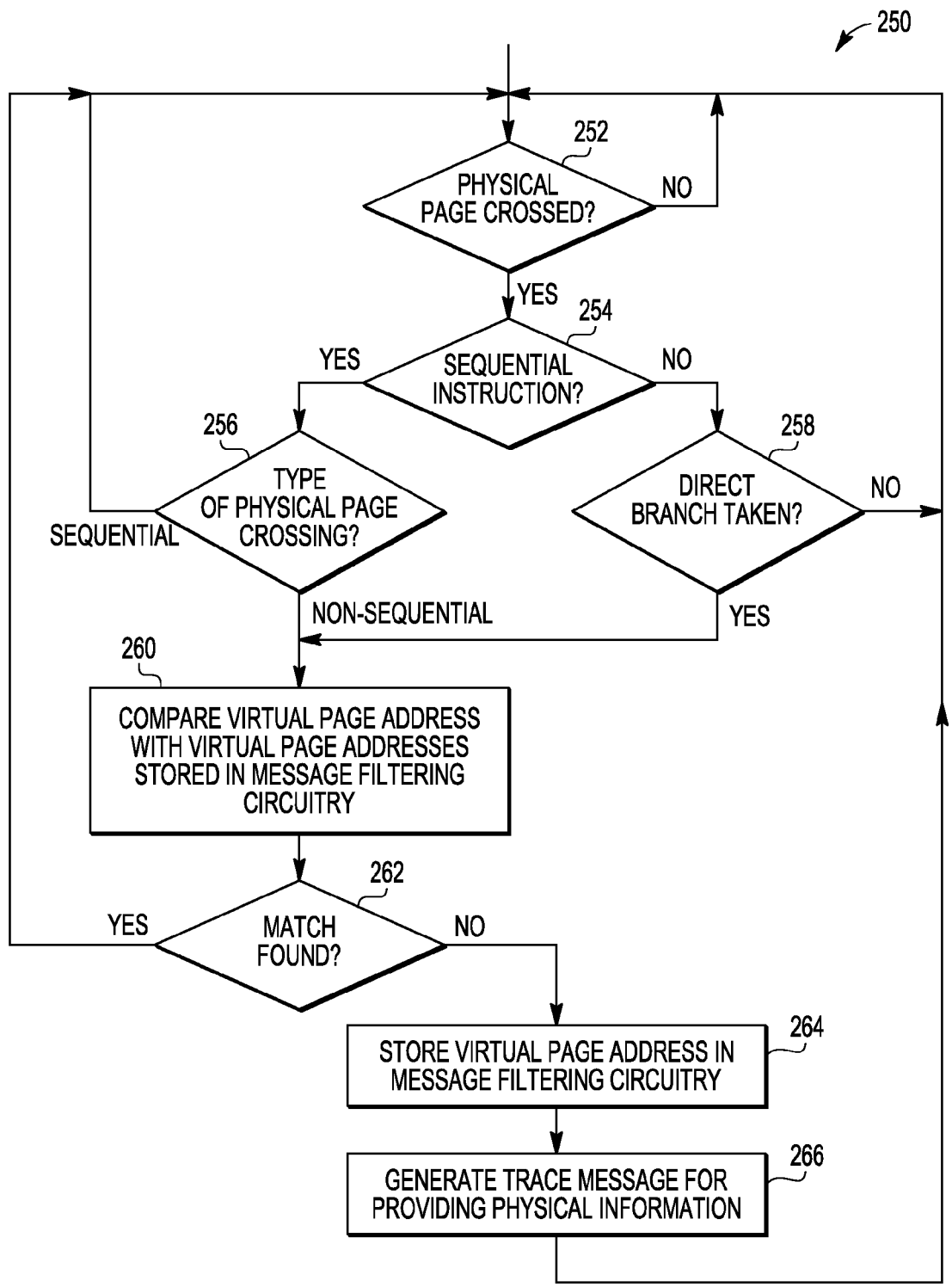
FIG. 15 illustrates in flow diagram form a method in accordance with one form of the present disclosure.

FIG. 15 illustrates a method 250 for selectively generating a program trace message with physical address information in accordance with one embodiment of the present disclosure. Flow begins at decision diamond 252 in which it is determined whether a physical page is crossed. If not, flow returns to decision diamond 252. If so, flow proceeds to decision diamond 254 where it is determined if the currently executing instruction is a sequential instruction in virtual memory to the previous instruction. If not, flow continues to decision diamond 258 where it is determined whether the current instruction is executed as a result of a direct branch being taken. If the result in decision diamond 258 is that the direct branch was not taken, flow returns to decision diamond 252. If the result in decision diamond 258 is that the direct branch was taken, flow continues to block 260. Note that the descriptions provided above with respect to blocks 101, 102, and 105 in FIG. 4 also apply to decision diamonds 252, 254, and 258, respectively.

At decision diamond 256, the type of physical page crossing is determined. For example, in response to the type of physical page crossing being a sequential page crossing (in which the next adjacent physical page is accessed), flow returns to decision diamond 252, and in response to the type of page crossing being a non-sequential (such as, for example, when the physical page is not adjacent to the previously accessed physical page) page crossing flow proceeds to block 260. Note that the descriptions for making this determination provided above with respect to decision diamond 103 in FIG. 4 apply to decision diamond 256. For example, as described above, a PPD value of one (1) indicates that the physical page crossing that occurred was a sequential page crossing, and flow returns to decision diamond 252. However, flow proceeds to block 260 when the detected physical page crossing was a non-sequential page crossing, such as when a previous page is accessed, e.g., indicated by a negative PPD value, or when the sequential page in physical memory is skipped, e.g., indicated by a value of PDD greater than one (1).

Note that the descriptions of blocks 260, 264, and 266, and decision diamond 262 are analogous to the descriptions of blocks 236, 242, and 244, and decision diamond 238, respectively, provided above with respect to FIG. 14. However, at decision diamond 262, if a match is found, flow returns to decision diamond 252, and after block 266, flow also returns to decision diamond 252. Therefore, if a match is not found in the stored previous virtual page addresses, the virtual page address of the current instruction is stored in message filtering circuitry 650 (e.g. in storage circuitry 652) and a trace message for providing physical address information is provided. However, if a match is found, no trace message is generated.

Therefore, it can be appreciated how trace message generation may be filtered based on virtual page crossings in order to reduce the occurrence of bottlenecking during real-time debug. For example, referring back to FIG. 12, the first time Loop1 is executed, program trace messages for providing physical page information for instructions d and a (which cross virtual and physical page boundaries) may be generated. Also, during the first time Loop1 is executed, the virtual page addresses for instructions d and a can be stored in storage circuitry 652 of message filtering circuitry 650. Therefore, during subsequent iterations of Loop1, message filtering circuitry 650 can use the stored virtual page addresses in storage circuitry 652 to filter the program trace messages with physical address information which are generated. In this manner, during the subsequent iterations of Loop1, a program trace message is not generated each time the virtual page is crossed from instruction c to d or from instruction e back to a.

Note that the methods described herein are independent of the attributes of a specific instruction set residing at the new page, and therefore is different than the previously known technique that generated a trace message to indicate when a newly encountered page stores instructions having a different instruction set attribute, such as an instruction length attribute, than the previous page. For example, the prior art discloses that a physical page of memory can store instructions from variable length instruction set, or from an instruction set having fixed length instructions.

Some of the above embodiments, as applicable, may be implemented using a variety of different information processing systems. For example, although FIG. 1 and the discussion thereof describe an exemplary memory system architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, different types of storage circuitry may used within the message filtering circuitry. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes a method including receiving a current page address corresponding to a current instruction in a sequence of instructions; determining that the current page address is for a different page of memory than a previous page address corresponding to a previous instruction in the sequence of instructions; comparing the current page address with a plurality of page addresses stored in a message filtering circuit; and when the current page address is determined to be different than any of the plurality of page addresses, storing the current page address in the message filtering circuit. Item 2 includes the method of item 1, wherein the current page address and the previous page address are both virtual page addresses. Item 3 includes the method of item 2 and further includes generating a trace message for providing physical address information, the physical address information corresponding to the current virtual page address. Item 4 includes the method of item 3, wherein the trace message is conditionally generated based upon a result of comparing the current page address with one or more of the plurality of page addresses. Item 5 includes the method of item 1, wherein determining that the current page address is for the different page of memory further includes determining that the current page address is for a page of the memory that is not adjacent to a page addressed by the previous page address. Item 6 includes the method of item 5, wherein determining that the current page address is for the page of the memory that is not adjacent to the page addressed by the previous page address further includes determining that a current physical page address is for a page of the memory that is not adjacent to a page addressed by a previous physical address. Item 7 includes the method of item 1, wherein storing the current page address in the message filtering circuit further includes storing the current page address in a first-in, first-out buffer of the message filtering circuit. Item 8 includes the method of item 1, wherein the method is performed during normal operation of a data processing system for real-time debugging of the data processing system.

Item 9 includes a method including receiving a current virtual page address corresponding to a current instruction in a sequence of instructions; determining that the current virtual page address is for a different page of memory than a previous virtual page address corresponding to a previous instruction in the sequence of instructions; comparing the current virtual page address with each of a plurality of virtual page addresses stored in a message filtering circuit; when the current virtual page address is determined to be different than any of the plurality of virtual page addresses storing the current page address in the message filtering circuit; and generating a trace message for providing physical address information corresponding to the current virtual page address. Item 10 includes the method of item 9, wherein determining that the current virtual page address is for a different page of memory than the previous virtual page address further includes determining that a physical page boundary is crossed. Item 11 includes the method of item 10, wherein determining that a physical page boundary is crossed further includes determining that the physical page boundary is crossed from a first physical page to a second physical page. Item 12 includes the method of item 11, wherein the second physical page is not adjacent to the first physical page. Item 13 includes the method of item 9, wherein storing the current virtual page address further includes storing the current virtual page address in a first-in, first-out buffer of the message filtering circuit. Item 14 includes the method of item 9, wherein the method is performed during normal operation of a data processing system for read-time debugging of the data processing system.

Item 15 includes a data processing system having a memory organized as a plurality of pages; an instruction fetch unit for fetching a sequence of instructions, the sequence of instructions having corresponding addresses; an execution unit for executing the sequence of instructions; and a debug unit. The debug unit having a page crossing detection circuit for receiving the addresses in the sequence, and for determining when a page boundary in the memory is crossed from a first page to a second page; and a message filtering circuit. The message filter circuitry includes a storage unit for storing a plurality of page addresses; a comparator for comparing the second page address to each of the plurality of address, and for providing an output to indicate when the second page address is different from each of the plurality of addresses; and a control circuit for causing the second page address to be stored in the storage unit when the output is provided by the comparator. Item 16 includes the data processing system of item 15, and further includes trace message generating circuitry, the trace message generating circuit for providing physical address information corresponding to the second page address. Item 17 includes the data processing system of item 15, wherein the storage unit is a first-in, first-out buffer. Item 18 includes the data processing system of item 15, wherein the first page is not adjacent to the second page. Item 19 includes the data processing system of item 15, wherein the comparator is for comparing virtual page addresses. Item 20 includes the data processing system of item 15, wherein the debug unit is for real-time debugging of the data processing system during a normal operating mode.

What is claimed is:

1. A method comprising:
receiving a current page address corresponding to a current instruction in a sequence of instructions;
determining that the current page address is for a different page of memory than a previous page address corresponding to a previous instruction in the sequence of instructions;
comparing the current page address with a plurality of page addresses stored in a message filtering circuit; and
when the current page address is determined to be different than any of the plurality of page addresses, storing the current page address in the message filtering circuit.

2. The method of claim 1, wherein the current page address and the previous page address are both virtual page addresses.

3. The method of claim 2, further comprising generating a trace message for providing physical address information, the physical address information corresponding to the current virtual page address.

4. The method of claim 3, wherein the trace message is conditionally generated based upon a result of comparing the current page address with one or more of the plurality of page addresses.

5. The method of claim 1, wherein determining that the current page address is for the different page of memory further comprises determining that the current page address is for a page of the memory that is not adjacent to a page addressed by the previous page address.

6. The method of claim 5, wherein determining that the current page address is for the page of the memory that is not adjacent to the page addressed by the previous page address further comprises determining that a current physical page address is for a page of the memory that is not adjacent to a page addressed by a previous physical address.

7. The method of claim 1, wherein storing the current page address in the message filtering circuit further comprises storing the current page address in a first-in, first-out buffer of the message filtering circuit.

8. The method of claim 1, wherein the method is performed during normal operation of a data processing system for real-time debugging of the data processing system.

9. A method comprising:
receiving a current virtual page address corresponding to a current instruction in a sequence of instructions;
determining that the current virtual page address is for a different page of memory than a previous virtual page address corresponding to a previous instruction in the sequence of instructions;
comparing the current virtual page address with each of a plurality of virtual page addresses stored in a message filtering circuit;
when the current virtual page address is determined to be different than any of the plurality of virtual page addresses storing the current virtual page address in the message filtering circuit; and
generating a trace message for providing physical address information corresponding to the current virtual page address.

10. The method of claim 9, wherein determining that the current virtual page address is for a different page of memory than the previous virtual page address further comprises determining that a physical page boundary is crossed.

11. The method of claim 10, wherein determining that a physical page boundary is crossed further comprises determining that the physical page boundary is crossed from a first physical page to a second physical page.

12. The method of claim 11, wherein the second physical page is not adjacent to the first physical page.

13. The method of claim 9, wherein storing the current virtual page address further comprises storing the current virtual page address in a first-in, first-out buffer of the message filtering circuit.

14. The method of claim 9, wherein the method is performed during normal operation of a data processing system for read-time debugging of the data processing system.

15. A data processing system comprising:
a memory organized as a plurality of pages;
an instruction fetch unit for fetching a sequence of instructions, the sequence of instructions having corresponding addresses;
an execution unit for executing the sequence of instructions; and
a debug unit comprising:
a page crossing detection circuit for receiving the addresses in the sequence, and for determining when a page boundary in the memory is crossed from a first page to a second page;
a message filtering circuit, comprising:
a storage unit for storing a plurality of page addresses;
a comparator for comparing an address of the second page to each of the plurality of page addresses, and for providing an output to indicate when the address of the second page is different from each of the plurality of page addresses; and
a control circuit for causing the address of the second page to be stored in the storage unit when the output is provided by the comparator.

16. The data processing system of claim 15, further comprising trace message generating circuitry, the trace message generating circuit for providing physical address information corresponding to the address of the second page.

17. The data processing system of claim 15, wherein the storage unit is a first-in, first-out buffer.

18. The data processing system of claim 15, wherein the first page is not adjacent to the second page.

19. The data processing system of claim 15, wherein the comparator is for comparing virtual page addresses.

20. The data processing system of claim 15, wherein the debug unit is for real-time debugging of the data processing system during a normal operating mode.

* * * * *